United States Patent
Vion et al.

(10) Patent No.: US 6,930,318 B2
(45) Date of Patent: Aug. 16, 2005

(54) DEVICE FOR REINITIALIZING A QUANTUM BIT DEVICE HAVING TWO ENERGY STATES

(75) Inventors: Denis Vion, Gif sur Yvette (FR); Daniel Esteve, Viroflay (FR); Philippe Joyez, Orsay (FR); Hugues Pothier, Paris (FR); Pierre-François Orfila, Palaiseau (FR); Cristian Urbina, Gif sur Yvette (FR); Eddy Collin, Plaisir (FR); Grégoire Ithier, Le Vesinet (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/735,604

(22) Filed: Dec. 12, 2003

(65) Prior Publication Data

US 2005/0098773 A1 May 12, 2005

(30) Foreign Application Priority Data

Nov. 7, 2003 (FR) .......................................... 03 13148

(51) Int. Cl.$^7$ .............................................. H01L 29/06
(52) U.S. Cl. ............. 257/9; 257/E29.071; 257/E29.168
(58) Field of Search ............................ 257/9, E29.071, 257/E29.168

(56) References Cited

U.S. PATENT DOCUMENTS 6,597,010 B2 * 7/2003 Eriksson et al. ............... 257/14
6,678,450 B1 * 1/2004 Franson ....................... 385/122

OTHER PUBLICATIONS

D. Vion, et al., "Manipulating the Quantum State of an Electrical Circuit", SCIENCE, vol. 296, May 3, 2002, pp. 886–889.

* cited by examiner

*Primary Examiner*—David Nelms
*Assistant Examiner*—Tu-Tu Ho
(74) *Attorney, Agent, or Firm*—Weingarten, Schurgin, Gagnebin & Lebovici LLP (57) ABSTRACT

The device for reinitializing to a state |0> a quantum bit device, or Qubit as it is otherwise known, having two states |0> and |1> associated with respective energy levels $E_0$ and $E_1$ where $E_0 < E_1$ comprises first means (31, 32) for generating a temporary increase in the probability of the quantum bit device relaxing from the state |1> to the state |0> and second means (21) for absorbing the transition energy $\Delta E_{01} = E_1 - E_0$ ceded by the quantum bit device when it relaxes from the state |1> to the state |0>. The device is applicable to Qubits having different physical media.

21 Claims, 5 Drawing Sheets

DEVICE FOR REINITIALIZING A QUANTUM BIT DEVICE HAVING TWO ENERGY STATES

TECHNICAL FIELD

The present invention consists in a device for reinitializing to a state |0> a quantum bit device having two states |0> and |1> associated with respective energy states $E_0$ and $E_1$, where $E_0 < E_1$.

Quantum bit devices (referred to hereinafter as Qubits) can have very many physical media: atoms or ions controlled optically or electromagnetically, polarized photons, nuclear spins controlled electromagnetically, integrated electronic devices, especially Josephson junction superconductors, or two-dimensional electron gas semiconductors, etc.

Independently of these physical media, a Qubit always constitutes a system with two separate states |0> and |1>. In most cases, the two base states correspond to two energy levels, while in rare cases (for example that of polarized photons) they correspond to two states that are not based on different energy levels.

The invention applies to all Qubits whose base states correspond to two energy levels. Without loss of generality, the state |0> is associated hereinafter with the lower energy level $E_0$ and the state |1> is associated hereinafter with the higher energy level $E_1$. The state |0> is also referred to herein as the fundamental state.

PRIOR ART

It must be possible to write, store, or modify information in a Qubit in a controlled manner, by selective coupling to other Qubits, and then to read the information. Writing consists in preparing the Qubit in any coherent superposition a|0>+b|1> of its two base states, where "a" and "b" are complex numbers called probability amplitudes. Coherent control of the quantum state of the Qubit entails controlling the evolution over time of the probability amplitudes "a" and "b".

Control of the probability amplitudes can be lost in two ways:

The first way is by depolarization, i.e. an uncontrolled increase in the modulus of one of the probability amplitudes to the benefit of the modulus of the other one. Depending on whether the modulus of the amplitude "a" of the fundamental level increases or decreases, depolarization consists in excitation or relaxation of the energy of the Qubit. Relaxation of the energy is an intrinsically random process characterized by a characteristic relaxation time $T_1$ defined as the average time for the Qubit initially prepared in the state |1> to return to the state |0>.

The second way to lose control of the probability amplitudes corresponds to the appearance of a random phase difference between the states |0> and |1>. In other words, for a Qubit not interacting with other Qubits, the ideal evolution, which is expressed mathematically as follows: a(t)|0>+b(t)|1>, is replaced by a partly random evolution of the type a(t)|0>+b(t)$e^{i\phi(t)}$|1>, where $\phi(t)$ is a random phase.

The Qubit must continue to evolve coherently for as long as possible in the face of the above two phenomena.

Before writing to a Qubit, it must be placed in a reference state that is generally its fundamental state |0>. In the prior art, this reinitialization is effected merely by waiting, for a time period equal to a few times the relaxation time $T_1$, for a very high probability of the Qubit relaxing towards the state |0>.

This kind of reinitialization can prove to be very slow in that the operation of a Qubit requires its quantum coherence to be maintained for as long as possible, and thus requires a relaxation time $T_1$ that is as long as possible. In other words, the better the performance of a Qubit, the longer the relaxation time $T_1$ and the longer its reinitialization takes.

SUMMARY OF THE INVENTION

The invention is specifically aimed at solving this problem of slow reinitialization and at enabling a Qubit offering good performance to be reinitialized rapidly, without significantly degrading its aptitude to evolve in a coherent manner.

According to the invention, the above objects are achieved by a device for reinitializing to a state |0> a quantum bit device having two states |0> and |1> associated with respective energy levels $E_0$ and $E_1$ where $E_0 < E_1$, which device is characterized in that it comprises first means for generating a temporary increase in the probability of the quantum bit device relaxing from the state |1> to the state |0> and second means for absorbing the transition energy $\Delta E_{01} = E_1 - E_0$ ceded by the quantum bit device when it relaxes from the state |1> to the state |0>.

This invention can also be defined by stating that the Qubit having two energy levels can be reinitialized by temporarily increasing its relaxation probability, the increase being achieved wholly or partly by temporary coupling to a dissipative device capable of absorbing its transition energy.

Finally, this invention can further be defined by stating that the Qubit having two energy levels can be reinitialized by changing its transition frequency in such a manner as to couple it to a system having at least one degree of freedom and a high quantum spectral density at the transition frequency of the Qubit.

With a Qubit whose two states |0> and |1> correspond to respective energy levels $E_0$ and $E_1$, where $E_0 < E_1$, this can be achieved using a reinitialization device of the invention wherein:

the second means are in the immediate energy environment of the quantum bit device and have at least one absorption peak whose value $\Delta E_{env}$ is:
sufficiently far away from the transition energy $\Delta E_{01} = E_1 - E_0$ of the quantum bit device to eliminate or to render negligible all interaction between the quantum bit device and said second means, but
sufficiently close to said transition energy for the quantum bit device to be able to operate under conditions such that the transition energy $\Delta E'_{01}$ becomes equal to or close to the value $\Delta E_{env}$ of the absorption peak, so that a strong coupling of energy between the quantum bit device and said second means can exist temporarily, and the first means are adapted to modify the transition energy $\Delta E_{01} = E_1 - E_0$ of the quantum bit device during reinitialization to said value $\Delta E'_{01}$ equal to or close to the value $\Delta E_{env}$ of the absorption peak.

The second means having at least one absorption peak of value $\Delta E_{env}$ can have a particular degree of freedom able to absorb the transition energy $\Delta E_{01} = E_1 - E_0$ of the quantum bit device when the latter is changed to the value $\Delta E'_{01}$ equal to or close to the value $\Delta E_{env}$ of the absorption peak.

The second means having an absorption peak of value $\Delta E_{env}$ can also have a plurality of degrees of freedom with a high quantum spectral density at the transition frequency $\nu_{01} = \Delta E_{01}/h$ of the quantum bit device, where h is Planck's constant. In this case there is a multiplicity of very close values of $\Delta E_{env}$.

The first means of the invention either reduce the coupling of the Qubit with its environment to an extremely low value, in order to minimize the effect of the incoherence of that environment, so as to increase the relaxation time $T_1$ to a very high value and to let the Qubit evolve coherently, or couple the Qubit to its environment, in order to maximize the incoherence by relaxation, i.e. in order to reduce the relaxation time $T_1$ to a very low value and to reinitialize the Qubit rapidly in the state $|0>$.

In one particular embodiment, the first means comprise means for generating specific reinitialization set points that are applied to the usual means for adjusting the quantum bit device to change the transition energy $\Delta E_{01}$ temporarily to the value $\Delta E'_{01}$ equal to or close to the value $\Delta E_{env}$ of the absorption peak.

More particularly, the specific reinitialization set points have a value outside the ranges used when the quantum bit device is allowed to evolve coherently, although this is not obligatory.

In another particular embodiment, the first means comprise specific means for adjusting operating parameters of the quantum bit device that act directly on the transition energy of the quantum bit device to change the transition energy $\Delta E_{01}$ temporarily to a value $\Delta E'_{01}$ equal to or close to the value $\Delta E_{env}$ of the absorption peak independently of the setting of the operating parameters of the quantum bit device chosen to cause it to evolve coherently.

As it uses only the fundamental characteristics of a Qubit having two energy levels, the invention is applicable to any Qubit of that type, regardless of its implementation technology.

In a first preferred implementation technology, the Qubits are electrical, with Josephson superconductor junctions. Coherent evolution thereof can be ensured by construction by minimizing their number of degrees of freedom, thereby conferring on these Qubits certain symmetry properties described below in this application, and by adjusting external parameters controlling their transition frequency.

The invention applies in particular to the preferred situation in which the electrical Qubit comprises a physical medium exhibiting quantum behavior and consisting of a superconductor integrated electronic device constructed using a Cooper-pair box with two Josephson junctions provided with a write circuit comprising a gate electrode, a read circuit comprising a read Josephson junction, having a Josephson energy much higher than that of the Josephson junctions of the Cooper-pair box, and magnetic means adapted to adjust the phase of the Qubit, as disclosed in the paper published in the journal Science 1069372 of 4 May 2002 "Manipulating the Quantum State of an Electrical Circuit" by D. Vion, A. Aassime, A. Cottet, P. Joyez, H. Pothier, C. Urbina, D. Esteve, M. H. Devoret.

A circuit of the above kind, referred to hereinafter as a Quantronium, is read by applying a current pulse adapted to toggle the voltage of the read Josephson junction.

The superconductor loop of a Qubit of this kind is constructed so that its transition frequency $v_{01}$ can be adjusted to a value that is stationary in relation to external disturbances and parameters, a required condition for writing information in the Qubit or letting it evolve coherently. In practice the adjustment is carried out by using a nearby magnetic loop to generate an adjustable magnetic flux acting on the phase $\delta$ of the Qubit.

The read circuit, which is independent of the write circuit, is electrically connected to the superconductor loop of the Qubit. In addition to the read Josephson junction; it comprises means for applying a current pulse $I_b$ of parameterizable duration and amplitude during the read stage and means for detecting phase jumps of $2\pi$ that appear at the terminals of the read Josephson junction, after the read pulse, for only one of the two states.

To study how the relaxation probability of the Qubit varies on application of this read pulse, measurements have been carried out by generating time plateaus on the rising edge of the pulse. Note that when the plateau reaches certain current values, each of which sets a certain transition energy of the Qubit, the probability of the Qubit relaxing becomes high (the relaxation time $T_1$ becomes short). These values correspond to resonances in the immediate environment of the Qubit, which in this case is merely the electrical read circuit.

In a Quantronium, the invention can be implemented in various ways.

The second means of the reinitialization device of the invention comprise a dissipative device that is typically a resonant circuit including a resistive member. To be more precise, the second means can be produced by intentionally introducing a resonance into the electrical read circuit of the Qubit, whose frequency is far away from the value that the transition frequency of the Qubit assumes when said frequency is stationary with respect to control parameters, but can be temporarily assumed by the transition frequency of the Qubit at reinitialization time.

The first means or coupling means can comprise a generator of control signals that are applied to adjustment means specific to the Qubit, for example:
 a current pulse of specific value applied to the magnetic coil (the preferred implementation of the magnetic adjustment means) acting on the phase $\delta$ of the Qubit;
 a current pulse of specific value applied to the usual control means that the read circuit constitutes.

A value that is never assumed in nominal operation is preferably chosen for the value of the magnetic flux in the superconductor loop and/or the current in the read junction. The current in the read junction can assume a value during the reinitialization phase whose sign is opposite the sign of the current pulse used to read the state of the Qubit, for example.

More generally, all the means for adjusting parameters operating on this circuit may constitute reinitialization means, on condition that specific input values are applied to them.

Operation is then as follows, in the case of a command generating a current pulse in the read circuit:
 to read information in the Qubit, or to let it evolve coherently, the magnetic flux across the superconductor loop of the Qubit and the current at the read junction are adjusted so that the transition frequency of the Qubit assumes its stationary value;
 to reinitialize the Qubit, a read current pulse is generated that temporarily changes the transition frequency of the Qubit to a value equal to or very close to the value of the resonant frequency intentionally introduced.

It is clear that this operation can be transposed in an obvious way to the situation of a current pulse in the coil acting on the phase $\delta$ of the Qubit.

The coupling means can also be specific to the reinitialization device, for example second magnetic means (such as a magnetic coil) acting on the phase $\delta$ of the Qubit, a second coupling gate of the Cooper-pair box, a second loop passing through the read Josephson junction and adapted to send a current pulse having an amplitude corresponding to a high probability of incoherence of the Qubit, etc. Once again, as for the previous example, it is obvious how to deduce the operation of the coupling means.

The value of the magnetic flux in the superconductor loop and/or of the current at the read junction is preferably a value that is never assumed in nominal operation. The current at the read junction can assume a value during the reinitialization phase whose sign is the opposite of the sign of the current pulse used to read the state of the Qubit, for example.

In a second technology, the Qubits can have as their physical medium an atom or an ion whose energy state is changed by the absorption or emission of a photon of frequency $v_{01}$ corresponding to the transition energy of the Qubit. Coherence can be maintained by placing the atom or ion in an electromagnetic cavity that is sufficiently small for it not to be able to absorb any photon at the frequency $v_{01}$, for example. The reinitialization device of the invention uses appropriate electromagnetic fields to shift the atom or ion out of this cavity so that it can be de-excited spontaneously, for example. It is more effective to move the atom or ion into a second cavity having an absorption mode at the frequency of the Qubit, for example.

Accordingly, in this situation, the first means of the device of the invention include means for varying the probability of the atom or ion absorbing energy; to be more precise, said means modify the dimensions of the space in which the atom or ion is confined. The second means of the device of the invention then consist of the new dissipative space into which the atom or the ion is moved.

In a third technology, the physical medium of the Qubits can be a quantum point produced in a two-dimensional electron gas and controlled by gate electrodes on or under the surface of the gas.

The two energy states corresponding to the two states of the Qubit are generally two electronic states of the quantum point separated by a transition energy $\Delta E_{01}$.

In this embodiment of a rapid reinitialization device of the invention, the second means comprise a resonant electrical circuit including a resistive component in the circuit of at least one gate electrode and the first means comprise a magnetic field source or gate voltage sources for applying a specific value of the gate voltage to the gate electrodes in order to vary the size of the quantum point in order to change the transition energy $\Delta E_{01}$ to a value $\Delta E'_{01}$ equal to or close to the value $\Delta E_{env}$ of an absorption peak of the electrical circuit controlling at least one of the electrodes defining the geometry of the quantum point.

BRIEF DESCRIPTION OF THE DRAWINGS

Other features and advantages of the invention will emerge from the following description of particular embodiments, provided by way of example, which description is given with reference to the appended drawings, in which.

DETAILED DESCRIPTION OF PARTICULAR EMBODIMENTS OF THE INVENTION

The preferred embodiment of an electrical Qubit is described first, more particularly the situation in which the Qubit is a superconductive electrical circuit produced using a Cooper-pair box with two Josephson junctions, a write circuit comprising a gate electrode, a read circuit comprising a read Josephson junction, having a Josephson energy significantly higher than that of the Josephson junctions of the Cooper-pair box, and magnetic means adapted to adjust the phase of the Qubit, as disclosed in the paper published in the journal Science 1069372 of 4 May 2002 "Manipulating the Quantum State of an Electrical Circuit" by D. Vion, A. Aassime, A. Cottet, P. Joyez, H. Pothier, C. Urbina, D. Esteve, and M. H. Devoret.

The above kind of circuit, which is referred to hereinafter as a Quantronium, is usually read by applying a current pulse adapted to toggle the read Josephson junction.

Figure 1:
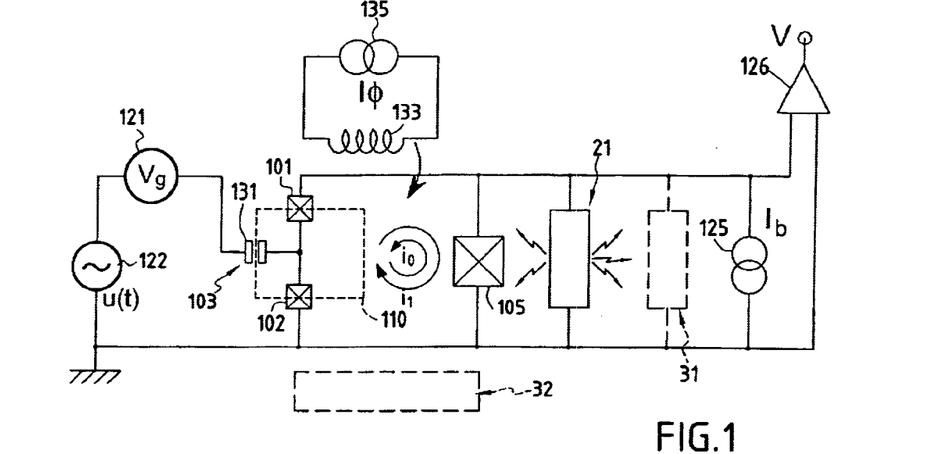
FIG. 1 is a theoretical diagram of an electronic Qubit of the Quantronium type based on Josephson junctions.

With reference to FIG. 1, the above kind of Quantronium can be defined by the fact that it comprises:

a) a superconductor islet between two Josephson junctions 101, 102 of comparable Josephson energy $E_{J1}$ and $E_{J2}$, said junctions being included in a type S superconductor loop constructed so that the transition frequency of the Qubit can be adjusted electrically to a stationary value for external disturbances and parameters, b) an electrode 131 capacitively coupled to the superconductor islet and which, because of the configuration of the circuit, is able to adjust the transition frequency between the two states of the Qubit, the electrode 131 also being able, during read stages, to place the Qubit in a coherent superposition of its two states, c) means 133, 135 for applying to the superconductor loop a magnetic flux φ that is able to adjust the transition frequency $v_{01}$ between the two states of the Qubit because of the configuration of the circuit, d) a third Josephson junction 105, referred to as the read junction, whose Josephson energy $E_{JL}$ has a value of the order of 50 to 100 times greater, and preferably approximately 80 times greater, than the Josephson energy $E_{J1}$ or $E_{J2}$ of the Josephson junctions 101, 102 defined hereinabove, the read Josephson junction 105 operating as a superconductor short circuit during a write or hold stage and as a threshold detector during a read stage, and e) a read circuit independent of the write circuit, electrically connected to the superconductor loop of the Qubit, and including, in addition to the read Josephson junction 105, means 125 for applying a current pulse $I_b$ of adjustable duration and amplitude during the read step and means 126 for detecting phase jumps at the terminals of the read Josephson junction 105 that are the result of the conjugate effects of the state of the Qubit and the read pulse.

Figure 5:
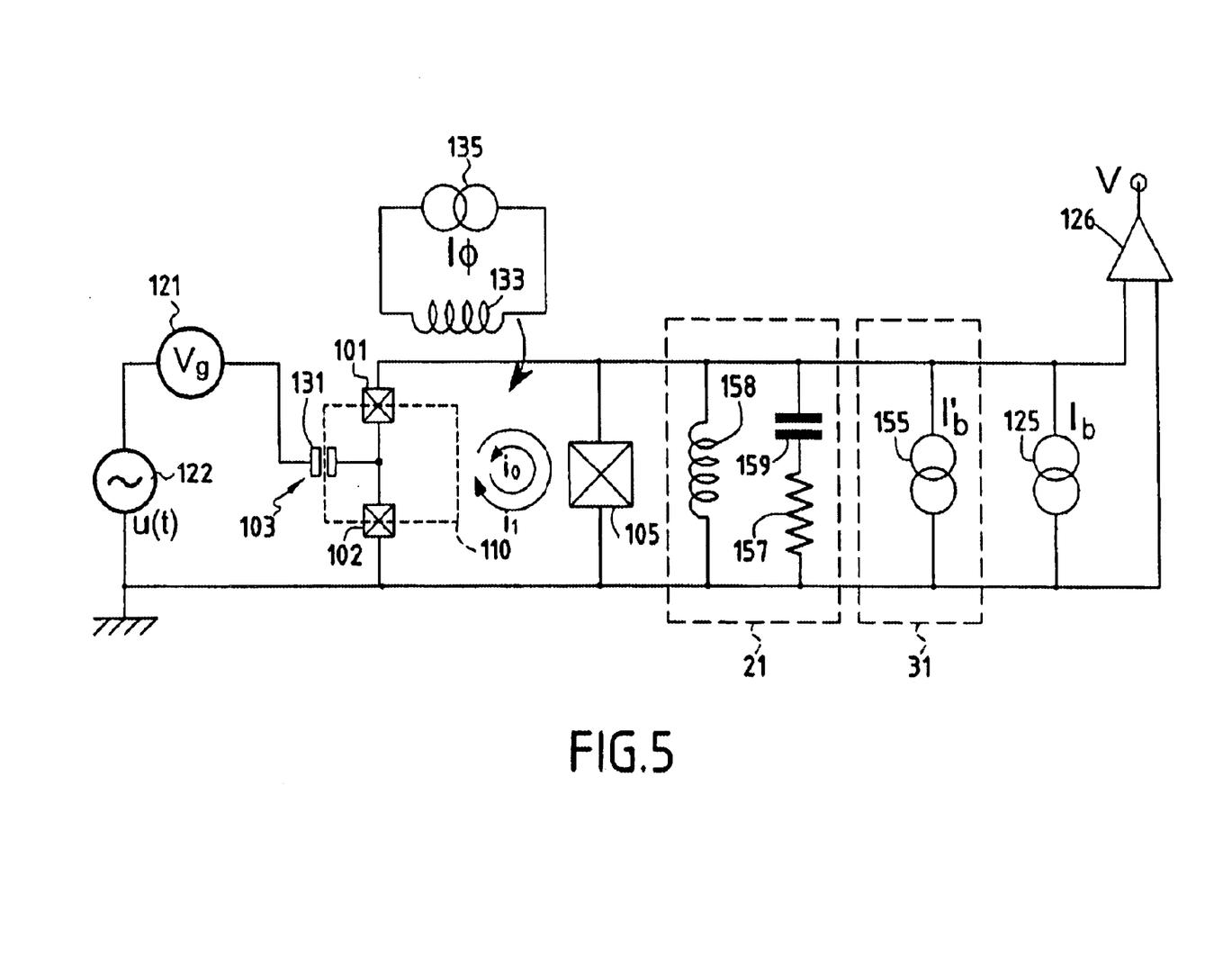
FIG. 5 is a diagrammatic representation of a circuit whose reinitialization means comprise control elements specific to the read pulse.

The preferred embodiment of a Quantronium of the invention comprises the following features (see FIG. 5) in addition to the above features a) to e):

f) a dissipative device 21 that is dissipative at only one or a few particular frequencies, far away from the nominal transition frequency of the Quantronium (typically a few gigahertz (GHz)) or multiples or sub-multiples thereof. It is generally implemented using a resonant circuit that includes a resistive member, for example. This circuit 21, connected to the terminals of the read Josephson junction 105, is represented diagrammatically in FIGS. 5 and 6 by an RLC circuit comprising a resistor 157, of resistance that is not the result of a construction imperfection but that is intentionally chosen to have a value capable of dissipating the energy of the Quantronium, an inductor 158, and a capacitor 159.

g) coupling means 31 for applying to the usual control means (the read circuit) a current pulse having a specific value to modify the transition energy of the Qubit from a value $\Delta E_{01} = E_1 - E_0$ to a value $\Delta E'_{01} \approx \Delta E_{env}$, the latter value corresponding to the resonant frequency of the resonant circuit 21 including a resistive member.

The whole of the electrical circuit of a Quantronium is designed so that its structure and operation are as symmetrical as possible. Also, the Qubit can be operated under conditions that promote maintaining its coherence.

The operating conditions that promote maintaining the coherence of the Qubit of the invention are:

1) prior to its use, and during manipulation of the quantum state, electrical adjustment of the transition frequency of the two quantum states to a value that is stationary with respect to the DC voltage $V_g$ applied to the capacitor 103 of capacitance $C_g$ at the electrode 131 that is not part of the charge islet and with respect to the magnetic flux across the Qubit, 2) during write stages (quantum state manipulation), cancellation of all the currents flowing in the loop of the Qubit proper, by a particular combination of the magnetic flux and the current at the read junction 105, 3) the read circuit is not activated permanently but only at certain times determined by read pulses $I_b$. The charge islet can be biased with charge via the capacitor 103 of capacitance $C_g$ that is connected to it.

This is effected by applying a superposition of the following to the electrode 131 of the capacitor 103 that is not part of the islet:

a DC bias voltage $V_g$ that in practice determines the resonant frequency of the loop that the Qubit constitutes; and a sequence of oscillations at the resonant frequency of a voltage u(t), the amplitude and the number of oscillations enabling the Qubit to be placed in a coherent superposition $a|0>+b|1>$ of its two quantum states.

The Josephson junctions 101, 102 defining the charge islet are chosen so that their Josephson energy $E_J$ is close to their Coulomb energy $E_C$. Each has an electrode that is part of the superconductor islet and an electrode that is not part of it. The phase difference δ between the electrodes of each junction that do not belong to the islet, as imposed by the read current pulse, causes currents to flow in the loop of the Qubit that depend on its state.

The two Josephson junctions 101, 102 are chosen so that their energy $E_J$ is very close to their energy $E_C$, which is generally achieved with junctions having very small dimensions. Moreover, the Josephson energies $E_J$ of the junctions 101, 102 have values that are as close as possible. The Josephson junction electrodes that are not part of the islet are connected together to form a superconductor loop, the whole forming the Qubit as such. In reality, this loop also includes the third Josephson junction 105, but this has much larger dimensions, with the result that its Josephson energy $E_J$ is very high in comparison to the Coulomb energy $E_C$.

It is this feature that enables the read junction to behave as a superconductor short circuit outside reading periods.

In nominal operation, corresponding to maintaining maximum coherence, a Quantronium is adjusted as follows:

The operation of one embodiment of a device of the invention is explained using the FIG. 1 theoretical diagram.

The charge islet is defined by the insulation of the Josephson junctions 101 and 102. The junctions 101 and 102 have very similar characteristics. They have very small dimensions (approximately 0.1 micrometers ($\mu$m) by 0.1 $\mu$m) and are designed so that the ratio $E_j/E_c$ of each of them is from 1 to 3. The value of this ratio $E_j/E_c$ for the actual junction of the Cooper-pair box 110, which is four times greater, is therefore from 4 to 12.

The superconductor loop is closed by a read junction 105 with very much larger dimensions (approximately 3 $\mu$m by 0.3 $\mu$m), behaving virtually as a short circuit for the Qubit outside the measurement steps. This is because its Josephson energy $E_{JL}$ is approximately 100 times greater than the Josephson energy of the junctions 101 and 102. Moreover, the ratio $E_j/E_c$ of the read junction 105 is approximately 5000 times to 10,000 times the ratio $E_j/E_c$ of the junctions 101 and 102.

This loop is subjected to a variable magnetic flux φ that is induced by a permanent magnet, a coil 133, or an electric wire carrying a current from a current source 135 placed nearby, possibly on the same substrate as the Qubit. The flux φ adjusts the co-ordinate δ of the operating point during manipulation of the Qubit. In particular, it compensates a negative rest current at the read junction 105 by maintaining the phase δ at the preferred value.

This combination of magnetic flux across the loop and negative rest current at the measuring junction 105 increases the ability to discriminate 0 and 1 states during reading, as explained later.

The circuit can be produced using any type S superconductor material, for example aluminum or niobium. The preferred embodiment uses vacuum deposition of aluminum conductive films on an Si/SiO$_2$ substrate.

The Josephson junctions 101 and 102 are produced by depositing two aluminum strips a few hundred nanometers apart along the same axis. The strips are oxidized to form Al$_2$O$_2$. A short third strip is then deposited in the gap between the first two strips so that it covers the first two strips over two areas each of which is approximately 0.1 $\mu$m×0.1 $\mu$m, thereby constituting the two Josephson junctions 101, 102. The third strip constitutes the islet of the Cooper-pair box, and thus also the first plate 131 of the capacitor 103 of capacitance $C_g$. Another strip parallel to the new strip constitutes the second plate of the capacitor 103.

The charge islet formed in this way has small dimensions.

The rest of the loop of the Qubit proper is produced in a similar manner but, at approximately 1 μm, the dimensions of the read Josephson junction 105 are much larger.

The operating temperature of the circuit must be very much lower than the transition energy of the Qubit divided by Boltzmann's constant $k_B$. It is in practice of the order of 50 millikelvins (mK) and is obtained with an $He_3/He_4$ dilution cooling system.

The transition frequency of the Qubit depends on external parameters in the form of the charge coupled to the islet and the magnetic flux across the loop. Electrical charge or magnetic flux noise is therefore liable to vary the transition frequency during manipulation of the Qubit, and therefore to induce a random phase shift that accounts for the incoherence of its quantum state. Sensitivity to this noise is therefore at a minimum at the operating points $F_1$, $F_2$, $F_3$ at which the transition frequency $v_{01}$ is stationary in relation to external parameters. These operating points are therefore preferred operating points. For a Qubit of the invention, these points are the saddle point $F_1$ in FIG. 2 (for which $N_g=0.5$ and $\delta=0$) and the peak point $F_2$ or $F_3$ (modulo $2\pi$) of the three-dimensional graph (for which $N_g=0$ or 1 and $\delta=0$).

In nominal operation, corresponding to maintaining maximum coherence, a state or a coherent superposition of states is written in a Quantronium as follows:

The Quantronium write stages are situated in the framework of general operating conditions that correspond to maintaining maximum coherence, namely:

1) prior to its use, and during manipulation of the quantum state, electrical adjustment of the transition frequency of the two quantum states to a value that is stationary with respect to the DC voltage $V_g$ applied to the capacitor 103 of capacitance $C_g$ at the electrode 131 that is not part of the charge islet and with respect to the magnetic flux across the Qubit, 2) during write stages (quantum state manipulation), cancellation of all the currents flowing in the loop of the Qubit proper, by a particular combination of magnetic flux and read junction 105 current.

Writing is effected by acting on the degree of freedom of charge by applying to the gate electrode 131 of the box 110 (coupled by the capacitor 103 of capacitance $C_g$), firstly, a DC voltage $V_g$ from a voltage source 121 in order to achieve the optimum operating point $N_g=1/2$, where $N_g$ represents the reduced bias charge of the islet $C_g V_g/2e$) and, secondly, radio-frequency pulses u(t) from a source 122 at the resonant frequency of the box 110 with the Qubit. The amplitude of the AC voltage u(t) corresponds to a coupled charge of the order of 0.01 times 2e.

Figure 3:
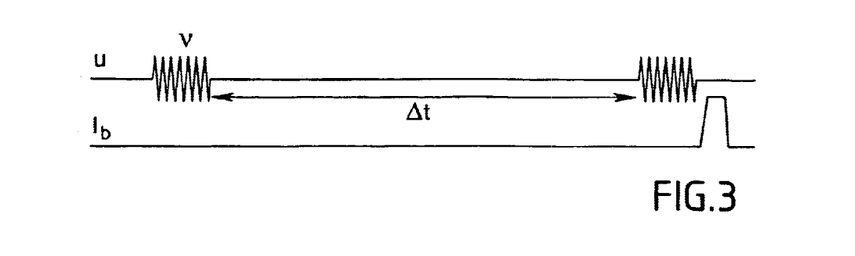
FIG. 3 shows examples of timing diagrams of signals involved in the manipulation of the measurement of quantum states of a quantum bit device of the invention.

During read stages, a Quantronium operates as follows:

To read the state of the Qubit, a current generator 125 in parallel with the read Josephson junction 105 generates a pulse $I_b$ (FIG. 3) of variable intensity and duration (typically 100 ns). During a pulse, the current generator 125 induces at the terminals of the read Josephson junction 105 a superconductive phase difference that, with the superconductive phases difference $\delta$ at the terminals of the Cooper-pair box 100 and with the magnetic flux $\phi$ across the loop, satisfies the following equation, in which $\phi_0$ is the magnetic flux quantum and the sign is ignored:

$$\delta = \gamma + \phi/\phi_0 2\pi$$

During the reading pulse, the phase $\gamma$ at the operating point $F_1$ ($N_g=0$, $\delta=0$) is displaced, which causes a shift in the phase $\delta$. The read junction 105 toggles about $\gamma=\pi/2$.

During reading, the current must be close to the critical current of the read junction 105 to have transition rates close to 0% and 100% for the respective two states of the Qubit. The bias current $I_b$ outside reading is chosen to maintain the circuit at the chosen point F, such as the points $F_1$, $F_2$, $F_3$ in FIG. 2. Finally, the choice of the flux $\phi$ coupled to the superconductor loop can be optimized so that the loop currents $i_0$ and $i_1$ associated with the states |0> and |1>, as revealed by the read pulse, are as different as possible.

Reading the state of the Qubit of the invention is optimized by choosing the magnetic flux $\phi$ induced across the superconductor loop so that the loop currents $i_0$ and $i_1$ associated with the states |0> and |1>, as revealed by the read pulse, are as different as possible. To compensate this magnetic flux and maintain a zero phase $\delta$ corresponding to the operating point $F_i$, outside read sequences the read current generator delivers, instead of a zero rest current, a rest current of the order of $-0.25 I_{bc}$, which is negative relative to the direction of the read pulses. The peak value $I_{bc}$ of these pulses remains unchanged. With this preferred optimization, the phase shift $\delta$ during the read pulse is from $\pi/2$ to $\pi$.

In nominal operation of this Qubit, corresponding to maintaining maximum coherence, the Qubit is decoupled from the read junction as follows:

The read loop has natural modes whose frequency must be as far away as possible from the natural frequency of the loop of the Qubit proper, in order to prevent the Qubit relaxing toward its fundamental state |0>.

This separation of the natural frequencies of the Qubit and the read junction exists already because of the great difference between the characteristics and dimensions of the read Josephson junction 105 and those of the Josephson junctions 101, 102 defining the islet. This difference is intentionally increased by adding one or more capacitors at the terminals of the read Josephson junction 105.

Figure 6:
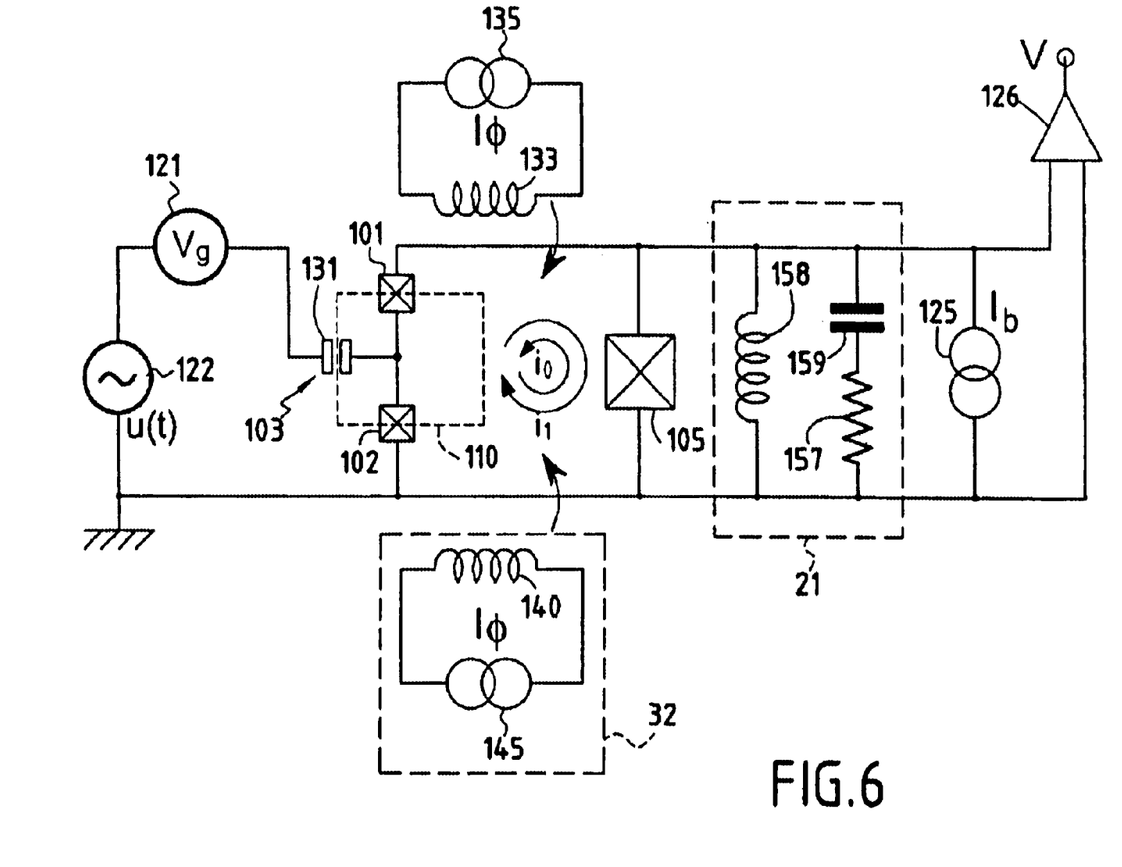
FIG. 6 is a diagrammatic representation of a circuit whose reinitialization means comprise control elements specific to the phase δ of the Qubit using a nearby magnetic loop.

To summarizer the ability of a Quantronium to evolve coherently is obtained by complying with three conditions:

a) A first condition aims to eliminate the effect of charge noise seen by the islet. Unlike the Cooper box measured when charged, the invention makes it possible to choose the ratio between the Josephson energy parameter $E_j$ and the Coulomb energy parameter $E_c$, so as to be simultaneously able:

to ensure that the spectrum of the energies is anharmonic, so as actually to form a Qubit, to make the transition frequency virtually completely insensitive to charge noise, and to manipulate the state of the Qubit by applying radio-frequency voltages to the gate 131 of the islet.

b) A second condition aims to limit relaxation of the Qubit, which contributes to incoherence, if the latter is placed its excited state, conventionally denoted |1>. A Qubit can be de-excited, transferring its energy to its immediate environment, here into the whole of the electrical circuit. To be more precise, this transfer is effected toward the real part 157 of the equivalent electrical impedance 157, 158 as seen from the Qubit (FIGS. 5 and 6). This impedance, even when minimized, cannot be strictly zero. For there to be no transfer of energy, it is therefore necessary to apply the condition that there be no flow of current in the superconductor loop of the Qubit. This condition of elimination from the loop of the Qubit of the overall current resulting from the state of the Qubit or from the coherent superposition of its states is obtained by precisely adjusting the magnetic flux to a zero value by means of an antagonistic flux applied to the loop of the Qubit by a field B applied either by an appropriate permanent magnet or by an induction loop in which a control current flows. This condition must be satisfied during write and hold stages, regardless of the state of the Qubit and therefore regardless of the flux to be eliminated.

c) A third condition seeks to limit the influence of environmental parameters on incoherence. If $|\Psi(t=0)\rangle$ denotes the following superposed state:

$$|\Psi(t=0)\rangle = |0\rangle + |1\rangle$$

that state ideally evolves freely by a relative phase shift of the components $|0\rangle$ and $|1\rangle$ at the transition frequency $v_{01}$ of the Qubit:

$$|\Psi(t)\rangle = |0\rangle + \exp(iv_{01}t)|1\rangle$$

If the transition frequency $v_{01}$ depends on external parameters represented by the generic variable x, any noise on the generic variable x is reflected in a fluctuation of the transition frequency $v_{01}$ and therefore a random error in the relative phase of the components $|0\rangle$ and $|1\rangle$; this is the phenomenon known incoherence. Incoherence is therefore at a minimum when the transition frequency $v_{01}$ is stationary with respect to x, i.e. when the following condition is satisfied:

$$dv_{01}/dx=0$$

For the purposes of the invention, there are essentially two external parameters on which the transition frequency $v_{01}$ depends, and which are symbolized by the generic variable x, namely the DC voltage $V_g$ applied to the capacitor 103 and the magnetic flux $\phi$ across the superconductor loop constituting the Qubit proper. The values of $V_g$ and $\phi$ are therefore set so that the following two conditions are simultaneously satisfied, which minimizes incoherence, especially in the case of a superposed state of the Qubit:

$$dv_{01}/dV_g=0$$

$$dv_{01}/d\phi=0$$

The use of the reinitialization device of the invention in the context of association with a Quantronium is described below.

The invention consists in generating a transient excursion of one or more of the three above-mentioned conditions to outside the functional conditions, to place the Qubit under contrasting conditions that induce an exchange of energy in the vicinity of the natural frequency of the Qubit, to obtain incoherence rapidly by relaxation. These conditions correspond electrically to sending energy into secondary degrees of freedom resonances of the circuit, followed by resistive dissipation of that energy.

The resonant dissipative device is placed at the terminals of the read Josephson junction and is represented diagrammatically in FIG. 5 by an RLC circuit comprising an intentionally dissipative resistor 157, an inductor 158, and a capacitor 159. It could equally well be represented, in an equivalent manner, by an inductor, a capacitor and a resistor in parallel, since in reality, at the frequencies concerned, the constants are distributed. Any element of the printed circuit simultaneously has inductive and capacitive characteristics that are virtually impossible to locate physically, as is well known to the person skilled in the art of microwaves. Furthermore, these characteristics also depend on its immediate environment, to the extent that its geometry alone, even if specified precisely, is insufficient to determine its distributed characteristics. All that can be done is to define its resonant frequency, which corresponds, as previously mentioned, to a particular degree of freedom $\Delta E_{env}$ able to absorb the transition energy $\Delta E_{01}=E_1-E_0$ of the Qubit when it is changed to the value $\Delta E'_{01} \approx E_{env}$. In the particular situation considered here, that frequency is around 8.06 GHz.

There are a number of variants of the means for temporarily coupling to the Qubit to reinitialize it.

In a preferred variant, a current pulse of specific value, of the order of −130 nanoamps (nA), is applied to the usual control means, consisting of the read circuit, to reduce the relaxation time $T_1$ to 59 ns, so that at the end of this time the probability of reading the initial information is around 32%, that is to say, for a reinitialization time of several times $T_1$, a value very close to zero.

A second preferred variant uses a second current generator 155 (module 31) at the terminals of the read Josephson junction and specific to the reinitialization device of the invention, as shown in the FIG. 5 diagram.

The equivalence of the above two variants will be obvious to a person skilled in the electronics art and either adding a second current generator or using the same current generator with a control input, dedicated or otherwise, adapted to receive reinitialization pulses, amounts to the same thing. To clarify the diagram, the coupling means are shown diagrammatically by additional means 155 for applying a current pulse $I'_b$ during the reinitialization step (FIGS. 5 and 6).

Figure 4A:
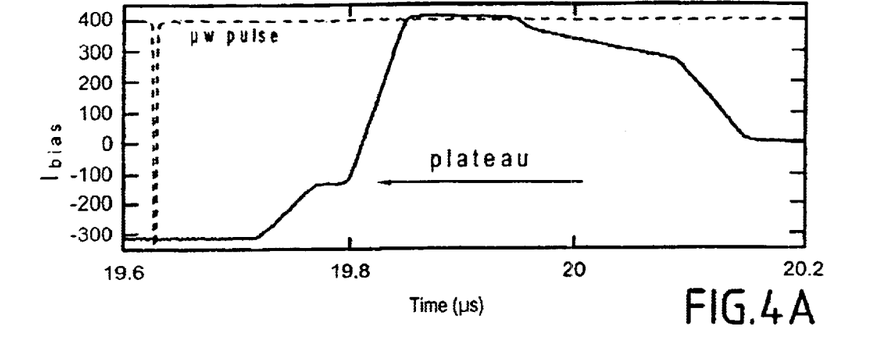
FIG. 4A is a temporal representation of a read current pulse applied to the Quantronium after the latter has been prepared in the state |1>, a plateau placed on the rising edge of the pulse in order to effect tests being displaceable to different values of the current at the read junction, with a variable duration.
Figure 4B:
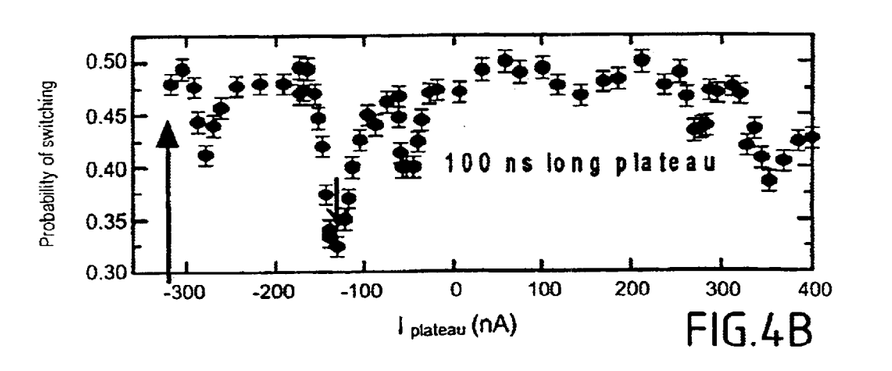
FIG. 4B shows the variation of the probability of measuring the Quantronium in the state |1> as a function of the current of the plateau on the rising edge of the read pulse, here with a plateau duration of 100 nanoseconds (ns)
Figure 4C:
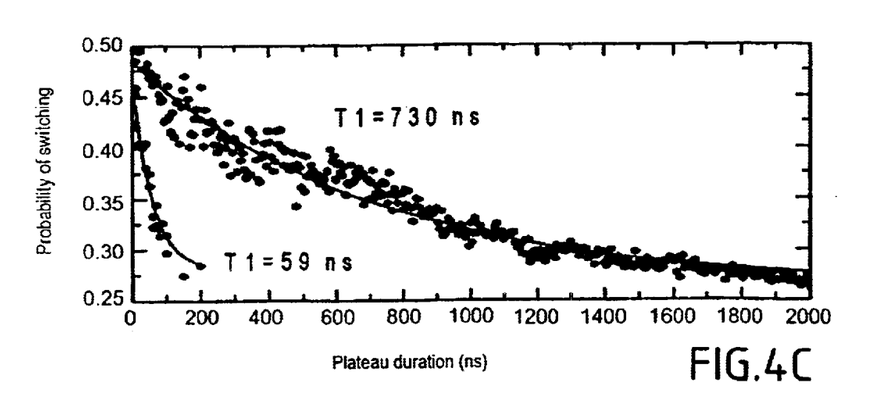
FIG. 4C shows the variation of the probability of measuring the Quantronium in the state |1> as a function of the duration of the plateau for two plateau current values inducing two different values of the transition frequency of the Quantronium.

The operation of the invention is explained using FIGS. 4A to 4C.

FIG. 4A represents, as a function of time, the amplitude of a read current pulse $I_b$ applied to the Quantronium at the terminals of the read Josephson junction 105 by the current generator 125. The pulse starts from a rest value of the order −300 nA that promotes maintaining coherence. Beforehand, the Quantronium has been prepared in a state $|1\rangle$ at a time marked by the dashed downward spike marked "µw pulse". Stabilization of the current at a value, called a current plateau, shown arbitrarily as −130 nA, is represented. The read pulse then continues to a value of the order of 400 nA; a plateau has been placed on the rising edge of the pulse to test the invention. Numerous values for the amplitude and duration of this plateau have been tested.

FIG. 4B shows, for all values of the current plateau $I_{Plateau}$, the probability of reading the state $|1\rangle$ prepared in the quantum bit at the time of the "µw pulse". All these measurements were carried out with a duration of the current plateau $I_{Plateau}$ of 100 ns. Note the strong variations in this probability in the figure. The higher the probability, as for the first arrow, pointing vertically upward, at the abscissa −320 nA, the better the information read approximates the information written: coherence is good and the relaxation time $T_1$ is 730 ns. As for the second arrow, pointing vertically downwards, at the abscissa −130 nA, the lower this probability, the more the read information departs from the information written associated with the state $|1\rangle$; the quantum bit easily loses its coherence, by relaxation, and the relaxation time $T_1$ falls to 59 ns.

For the two values −320 nA and −130 nA of the current plateau, FIG. 4C shows the variation in the probability that the Quantronium will be measured in the state $|1\rangle$ as a function of the duration of the plateau. We have seen that a read pulse induces at the terminals of the read Josephson junction 105 a superconductive phase difference that, together with the superconductive phase difference δ at the terminals of the Cooper box 110 and the magnetic flux $\phi$ across the loop, satisfies the following equation, in which $\phi_0$ is the magnetic flux quantum and the sign is ignored:

$$\delta=\gamma+\phi/\phi_0 2\pi$$

Figure 2:
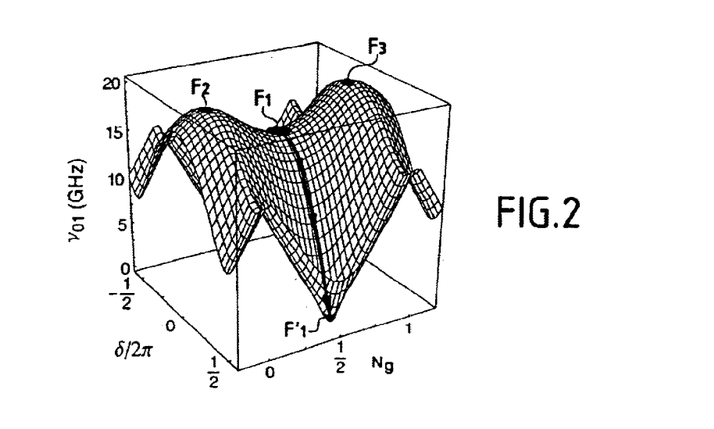
FIG. 2 is a three-dimensional diagram depicting the choice of the operating point of a quantum bit device of the invention.

At the operating point, for example, in FIG. 2, the point $F_1$ ($N_g=0$, $\delta=0$) during the read pulse, the phase $\gamma$ is subjected to a displacement that generates a shift in the phase $\delta$. During the plateau, the operating point on the FIG. 2 curve is displaced in a plane defined by a constant value of $N_g$. For example, the point $F_1$ becomes the point $F'_1$ during the current plateau $I_{Plateau}$. The transition frequency of the quantum bit, which was $\Delta E_{01}=E_1-E_0$ at the operating point $F_1$, becomes $\Delta E'_{01}=E'_1-E'_0$ at the operating point $F'_1$. It then suffices to choose the frequency of the resonant circuit so that $\Delta E_{env} \approx \Delta E'_{01}$.

This value of the current $I_{Plateau}$ can in practice be obtained either by applying specific set points to the current generator 125 designed for the read pulse or by using a second current generator $I'_b$ 155 connected in parallel for this purpose. For example, with a current of −130 nA and a dissipative circuit resonant frequency of the order of 8.06 GHz, a relaxation time $T_1$ less than 60 ns is obtained and the relaxation probability reaches 97% after 200 ns.

It goes without saying that the longer the quantum device is able to maintain its coherence, the greater is the advantage of using the relaxation device of the invention.

FIG. 6 shows an embodiment in which the coupling means or first means comprise a module 32 with a magnetic coil 140 placed in the vicinity of the Qubit and acting on its phase $\delta$ and a generator 145 of current pulses with an amplitude adequate to change the transition energy $\Delta E_{01}$ temporarily to a value $\Delta E_{01}$ equal to or close to the value $\Delta E_{env}$ of the absorption peak.

Figure 7:
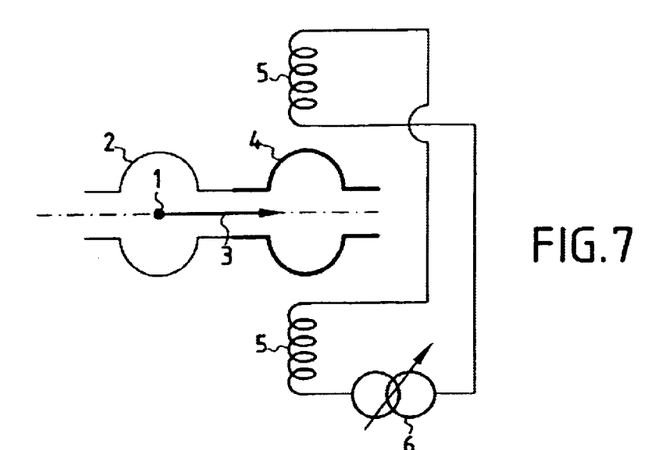
FIG. 7 is a diagrammatic representation of an ionic Qubit, showing a device for communicating with an electromagnetic cavity and means for displacing the ion therein.

A preferred embodiment of the invention using an ionic Qubit is described below with reference to FIG. 7.

The energy state of the atom or ion 1 is changed by the absorption or emission of a photon of frequency $v_{01}$ corresponding to the transition energy of the Qubit. The condition for writing information in the Qubit or letting it evolve coherently entails placing it in an electromagnetic cavity 2 that is sufficiently small for it not to be able to absorb a photon at the frequency $v_{01}$.

According to the invention, the dissipative device corresponds to an environment in which photons can be emitted by the atom or ion (cavity 4). The control device consists either of means able to vary the ratio between the transition frequency and the dimensions of the space in which the atom or ion 1 is confined (for example a set of laser beams or means for generating an appropriate magnetic field), or of a laser or electromagnetic device for moving it from a cavity 2 in which it is confined into a cavity 4 that is much larger (or even not into a cavity at all), so that it can become de-excited spontaneously.

Accordingly, in the case of an atom or ion 1 producing a Qubit having two energy levels, the Qubit is either trapped by means of electromagnetic fields or free to move because of its inherent velocity.

The electromagnetic cavity 2 has very low absorption and therefore a high quality factor. As appropriate, the cavity can have:
- a natural frequency equal to or close to the transition frequency of the Qubit if it is used for coherent control of the Qubit or to mediate interaction with another Qubit that may enter the cavity subsequently,
- a natural Fundamental frequency that is significantly higher than the transition frequency of the Qubit, to prevent any exchange of energy between the cavity and the Qubit.

For fast reinitialization, the atom or ion 1 is shifted toward the area in which the Qubit can relax rapidly into its fundamental state by application of a locomotor electromagnetic field, by means not shown in the drawing.

If the atom or ion is moved because of its initial velocity, the first means of the device of the invention that define a coupling device simply comprise means for temporarily suppressing the means that keep the atom or ion in the very low absorption cavity. If the atom or ion is moved by electromagnetic means, those means constitute the first means of the device of the invention.

The area of rapid relaxation of the Qubit can be the interior of another electromagnetic cavity 4 having a low quality factor (high absorption), which defines the dissipative second means of the device of the invention. For the Qubit to relax rapidly, one of the natural frequencies of the cavity 4 must be equal to or close to the frequency of the Qubit.

Using appropriate electromagnetic fields, the transition frequency of the Qubit can be changed to a value equal to or close to the low quality factor resonant mode chosen for reinitialization. FIG. 7 shows by way of example Helmholtz coils 5 energized by a current source 6 and adapted to use the Zeeman effect to vary temporarily the transition frequency of the Qubit.

A preferred embodiment with a quantum point produced in a two-directional electron gas is described below with reference to FIG. 8.

In one particular technology, the Qubits can have as their physical medium a quantum point produced in a two-dimensional electron gas controlled by gate electrodes 12, 13 on or under the surface of the gas. The two energy states corresponding to the two states of the Qubit are generally two electronic states of the quantum point separated by a transition energy $\Delta E_{01}$, controlled by the voltage at the gate electrodes 12, 13; a negative voltage of higher amplitude confines the quantum point more and increases the offset between the energy levels, and thus between the states $E_0$ and $E_1$, and therefore increases the transition energy $\Delta E_{01}$. The gate electrodes 12, 13 are generally at the same bias voltage.

According to the invention, the dissipative device corresponds to a resonant electrical circuit 16 including a resistive member 161 in the circuit of at least one gate electrode 13. For example, the control device consists of a source of magnetic field or a specific value of the gate voltage applied to the electrodes, capable of changing the transition energy $\Delta E_{01}$ to a value equal to or close to that of an absorption peak of the electrical circuit controlling at least one of the electrodes 12, 13 defining the geometry of the quantum point, which amounts to the same thing as saying in order to increase the transition energy $\Delta E_{01}$ to a value $\Delta E'_{01}=\Delta E_{env}$.

Figure 8:
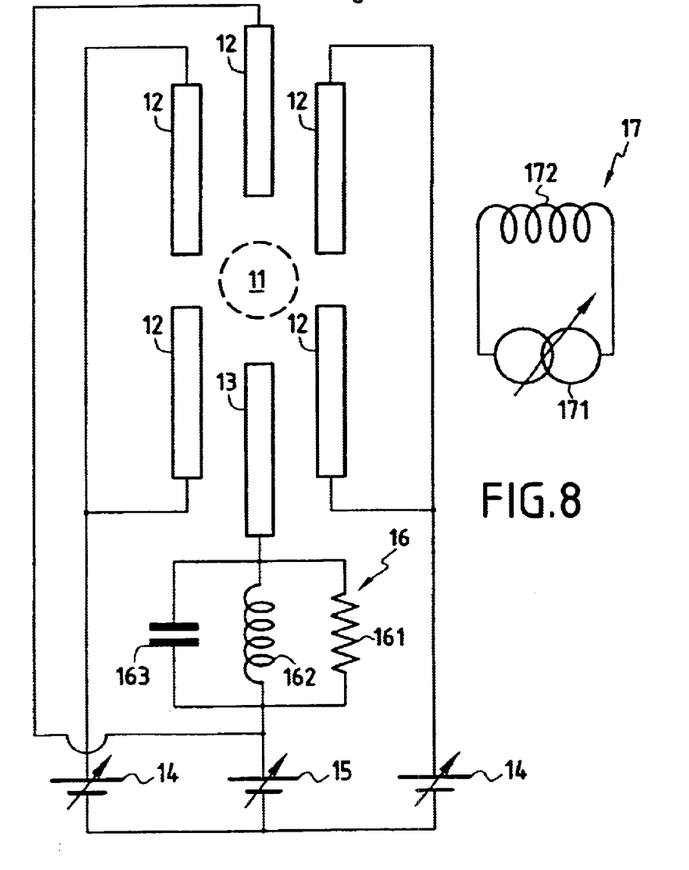
FIG. 8 is a diagrammatic representation of a "Qubit" with a "quantum point" in a two-dimensional gas, showing an electrical circuit simultaneously inducing modification of its size (and therefore of the transition frequency of the Qubit) and absorption of its energy in a given frequency mode.

Turning to FIG. 8, it can therefore be seen that the quantum point 11 is defined by voltages applied by gate electrodes 12, 13 themselves energized by adjustable gate voltage sources 14, 15. The gate electrodes 12 are used to define the region of space containing the quantum point 11. The gate electrode 13 can be of the same type as the gate electrodes 12, but can also be dedicated to reinitializing the Qubit.

A voltage pulse can be applied temporarily to the electrode 13 by the voltage source 15 to modify the size of the quantum point 11 and change the transition frequency of the Qubit to a value equal to or close to a resonant frequency of the exterior environment.

The circuit 17 comprises a current source 171 and a coil 172 and is used to generate a magnetic field in the region of the quantum point. This circuit can be used to apply a magnetic field pulse to change the transition frequency of the Qubit to a value equal to or close to an external environment resonant frequency.

The resonant circuit 16 is between the voltage source 15 and the gate electrode 13 and comprises a resistor 161, an inductor 162, and a capacitor 163 connected in parallel. The resonant mode of the control circuit of the gate 13 is able to absorb the energy of the Qubit when its transition energy coincides with the resonant mode, which mode could equally be found in one of the circuits of the gate electrodes 12 or even in the circuit 17.

What is claimed is:

1. A device for reinitializing to a state $|0>$ a quantum bit device having two states $|0>$ and $|1>$ associated with respective energy levels $E_0$ and $E_1$ where $E_0<E_1$, which device is characterized in that it comprises first means for generating a temporary increase in the probability of the quantum bit device relaxing from the state $|1>$ to the state $|0>$ and second means for absorbing the transition energy $\Delta E_{01}=E_1-E_0$ ceded by the quantum bit device when it relaxes from the state $|1>$ to the state $|0>$.

2. A quantum bit device reinitializing device according to claim 1, characterized in that the second means are in the immediate energy environment of the quantum bit device and have at least one absorption peak whose value $\Delta E_{env}$ is:
   sufficiently far away from the transition energy $\Delta E_{01}=E_1-E_0$ of the quantum bit device to eliminate or to render negligible all interaction between the quantum bit device and said second means, but
   sufficiently close to said transition energy for the quantum bit device to be able to operate under conditions such that the transition energy $\Delta E'_{01}$ becomes equal to or close to the value $\Delta E_{env}$ of the absorption peak, so that a strong coupling of energy between the quantum bit device and said second means can exist temporarily,
and the first means are adapted to modify the transition energy $\Delta E_{01}=E_1-E_0$ of the quantum bit device during reinitialization to said value $\Delta E'_{01}$ equal to or close to the value $\Delta E_{env}$ of the absorption peak.

3. A quantum bit device reinitializing device according to claim 2, characterized in that the second means have at least one absorption peak of value $\Delta E_{env}$ having a particular degree of freedom able to absorb the transition energy $\Delta E_{01}=E_1-E_0$ of the quantum bit device when the latter is changed to the value $\Delta E'_{01}$ equal to or close to the value $\Delta E_{env}$ of the absorption peak.

4. A quantum bit device reinitializing device according to claim 2, characterized in that the second means having an absorption peak of value $\Delta E_{env}$ have a plurality of degrees of freedom with a high quantum spectral density at the transition frequency $\nu_{01}=\Delta E_{01}/h$ of the quantum bit device, where h is Planck's constant.

5. A quantum bit device reinitializing device according to claim 2, characterized in that the first means comprise means for generating specific reinitialization set points that are applied to the usual means for adjusting the quantum bit device to change the transition energy $\Delta E_{01}$ temporarily to the value $\Delta E'_{01}$ equal to or close to the value $\Delta E_{env}$ of the absorption peak.

6. A quantum bit device reinitializing device according to claim 5, characterized in that the specific reinitialization set points have a value outside the ranges used when the quantum bit device is allowed to evolve coherently.

7. A quantum bit device reinitializing device according to claim 2, characterized in that the first means comprise specific means for adjusting operating parameters of the quantum bit device that act directly on the transition energy of the quantum bit device to change the transition energy $\Delta E_{01}$ temporarily to a value $\Delta E'_{01}$ equal to or close to the value $\Delta E_{env}$ of the absorption peak independently of the setting of the operating parameters of the quantum bit device chosen to cause it to evolve coherently.

8. A quantum bit device reinitializing device according to claim 1, characterized in that the quantum bit device comprises a physical medium that exhibits quantum behavior and consists of a superconductor integrated electronic device having Josephson junctions, a Cooper-pair box, and a read Josephson junction activated by a current pulse.

9. A quantum bit device reinitializing device according to claim 5, characterized in that the first means comprise means for generating specific reinitialization set points in the form of a current pulse that are applied to the read Josephson junction and the amplitude of the current pulse is chosen to maximize the relaxation of the quantum bit device.

10. A quantum bit device reinitializing device according to claim 9, characterized in that the amplitude of the current pulse is outside the range used during a read operation.

11. A quantum bit device reinitializing device according to claim 5, characterized in that:
   the quantum bit device comprises a physical medium that exhibits quantum behavior and consists of a superconductor integrated electronic device having Josephson junctions, a Cooper-pair box, and a read Josephson junction activated by a current pulse; and
   it comprises magnetic adjustment means acting on the phase $\delta$ of the quantum bit device that include a magnetic coil and a current pulse generator and the first means comprise means for generating specific reinitialization set points in the form of a current pulse of specific value applied to the magnetic coil operating on the phase $\delta$ of the quantum bit device.

12. A quantum bit device reinitializing device according to claim 11, characterized in that the first means comprise a second magnetic coil in the vicinity of the quantum bit device and acting on its phase $\delta$ and a generator of current pulses of suitable amplitude to change the transition energy $\Delta E_{01}$ temporarily to a value $\Delta E'_{01}$ equal to or close to the value $\Delta E_{env}$ of the absorption peak.

13. A quantum bit device reinitializing device according to claim 11, characterized in that the first means comprise a second gate for coupling the Cooper-pair box and a generator of voltage pulses of suitable amplitude to change the transition energy $\Delta E_{01}$ temporarily to a value $\Delta E'_{01}$ equal to or close to the value $\Delta E_{env}$ of the absorption peak.

14. A quantum bit device reinitializing device according to claim 11, characterized in that the first means comprise a second circuit loop passing through the read Josephson junction and adapted to send into said read Josephson junction a current pulse of suitable amplitude to change the transition energy $\Delta E_{01}$ temporarily to a value $\Delta E'_{01}$ equal to or close to the value $\Delta E_{env}$ of the absorption peak.

15. A quantum bit device reinitializing device according to claim 8, characterized in that the second means comprise a dissipative device at the terminals of the read Josephson junction and including a dissipative resistor, an inductor and a capacitor.

16. A quantum bit device reinitializing device according to claim 1, characterized in that the quantum bit device comprises a physical medium exhibiting quantum behavior and consisting of the energy state of an atom or an ion.

17. A quantum bit device reinitializing device according to claim 16, characterized in that the first means comprise means for varying the probability of the atom or ion emitting energy.

18. A quantum bit device reinitializing device according to claim 16, characterized in that the means for varying the probability of the atom or ion emitting energy modify the dimensions of the space in which said atom or ion is confined.

19. A quantum bit device reinitializing device according to claim 16, characterized in that the first means comprise a device for moving the atom or ion from a cavity in which it is confined into a much larger cavity.

20. A quantum bit device reinitializing device according to claim 1, characterized in that the quantum bit device comprises a physical medium exhibiting quantum behavior and consisting of a quantum point produced in a two-directional electron gas controlled by gate electrodes over or under the surface of the gas.

21. A quantum bit device reinitializing device according to claim 2, characterized in that:

the quantum bit device comprises a physical medium exhibiting quantum behavior and consisting of a quantum point produced in a two-directional electron gas controlled by gate electrodes over or under the surface of the gas; and the second means comprise a resonant electrical circuit including a resistive component in the circuit of at least one gate electrode and the first means comprise a magnetic field source or gate voltage sources for applying a specific value of the gate voltage to the gate electrodes in order to vary the size of the quantum point to change the transition energy $\Delta E_{01}$ to a value $\Delta E'_{01}$ equal to or close to the value $\Delta E_{env}$ of the absorption peak of the electrical circuit controlling at least one of the electrodes defining the geometry of the quantum point.

* * * * *

UNITED STATES PATENT AND TRADEMARK OFFICE
CERTIFICATE OF CORRECTION

| | | |
|---|---|---|
| PATENT NO. | : 6,930,318 B2 | Page 1 of 1 |
| APPLICATION NO. | : 10/735604 | |
| DATED | : August 16, 2005 | |
| INVENTOR(S) | : Denis Vion et al. | |

It is certified that error appears in the above-identified patent and that said Letters Patent is hereby corrected as shown below:

Column 1, line 4, insert --This application claims priority to a French application No. 03 13148 filed November 7, 2003. --;

Column 2, line 64, "h" should read --h--;

Column 10, line 37, "summarizer" should read --summarize,--;

Column 11, line 21, "x" should read --x--;

Column 11, line 22, "x" should read --x--;

Column 11, line 27, "x" should read --x--;

Column 11, line 35, "x" should read --x--; and

Column 15, line 53, claim 4, "h" should read --h--.

Signed and Sealed this

Twenty-eighth Day of November, 2006

JON W. DUDAS
*Director of the United States Patent and Trademark Office*